United States Patent
Meis et al.

(10) Patent No.: US 6,324,468 B1
(45) Date of Patent: Nov. 27, 2001

(54) PROCESS FOR TRANSMITTING ROUTE INFORMATION WHICH CONCERNS A ROUTE OF A VEHICLE IN A ROAD NETWORK BETWEEN A TRAFFIC INFORMATION CENTER AND A TERMINAL IN A VEHICLE, TRAFFIC INFORMATION CENTER AND TERMINAL

(75) Inventors: Josef Meis, Münster; Andreas Parra, Hamburg; Peter Stangier, Wesseling, all of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/331,134

(22) PCT Filed: Nov. 26, 1997

(86) PCT No.: PCT/DE97/02818

§ 371 Date: Jul. 13, 1999

§ 102(e) Date: Jul. 13, 1999

(87) PCT Pub. No.: WO98/27529

PCT Pub. Date: Jun. 25, 1998

(30) Foreign Application Priority Data

Dec. 16, 1996 (DE) .............................. 196 53 679
Nov. 10, 1997 (DE) .............................. 197 50 777

(51) Int. Cl.[7] .............................. G01C 21/26; G05D 1/00

(52) U.S. Cl. .............................. 701/202; 701/25; 701/208; 340/496

(58) Field of Search .............................. 701/202, 208, 701/209, 117, 118, 119, 22, 23, 24, 25, 211; 340/988, 996

(56) References Cited

U.S. PATENT DOCUMENTS

| 5,839,086 | * | 11/1998 | Hirano | 701/201 |
|---|---|---|---|---|
| 6,061,625 | * | 5/2000 | Fastenrath | 701/117 |
| 6,111,521 | * | 8/2000 | Mulder et al. | 340/905 |

* cited by examiner

Primary Examiner—Yonel Beaulieu
(74) Attorney, Agent, or Firm—Cohen, Pontani, Lieberman & Pavane

(57) ABSTRACT

An efficient transmission of route information, especially also in remote areas for which a terminal unit has no detailed map or location reference list, is made possible by a terminal unit, a central traffic station and a process for the transmission of route information concerning a route of a vehicle in a traffic network between a central traffic station and a terminal unit in a vehicle. The route information concerns path points lying on the route, wherein a path point is defined at every location where it is recommended that the vehicle turns off from a road. The next road following in the driving direction of the route, the location of the path point, and the driving direction after the path point are designated in each instance in route information for a path point.

20 Claims, 2 Drawing Sheets

PROCESS FOR TRANSMITTING ROUTE INFORMATION WHICH CONCERNS A ROUTE OF A VEHICLE IN A ROAD NETWORK BETWEEN A TRAFFIC INFORMATION CENTER AND A TERMINAL IN A VEHICLE, TRAFFIC INFORMATION CENTER AND TERMINAL

BACKGROUND OF THE INVENTION

1. Field of the Invention

The invention is directed to a process for the transmission of route information concerning a route of a vehicle in a traffic network between a central traffic station and a terminal unit in a vehicle, a central traffic station, and a terminal unit.

2. Discussion of the Prior Art

A central traffic station can prepare traffic status reports, traffic forecasts and traffic navigation aids for a terminal unit from information obtained from stationary detectors in a traffic network and obtained from mobile detectors (in vehicles FCD) and transmitted to the central traffic station. For the transmission of obtained traffic information from a vehicle (via mobile radio, etc.) to a central traffic station as well as for the transmission of information about traffic status reports, traffic forecasts, traffic navigation aids, etc. from a central station (via mobile radio, etc) to a terminal unit, it is required to designate each location to which a piece of information refers. When there is an identical map in the terminal unit and in the central station, location referencing with respect to the map is possible; however, maps are constantly being updated because of new roads, changes in driving direction, detours, construction sites, etc., so that different map versions may exist in the terminal unit and in the central station. A problem in location referencing based exclusively on geographic longitude and latitude consists in the required allocation to a road in a map; in particular, for example, there may be no road at a measured location position of a terminal unit in the map in the central station or no road in the map terminal unit at a geographic location position in the map which is referenced by a central traffic station. The use of shared reference tables for locations in a traffic network is limited with respect to the degree of detail because of limited available storage capacity. Such processes are accordingly suitable only to a limited extent for the transmission of information within the framework of a navigation service which is also especially advisable in remote areas.

SUMMARY OF THE INVENTION

The object of the invention is a simple and efficient optimizing of the location referencing in the transmission of information between a terminal unit and a central traffic station.

The invention makes possible an efficient location referencing also in remote areas for which there may be no detailed map in the terminal unit and/or no reference table with code designations and locations assigned thereto in the traffic network. In this respect, the transmitted route information concerning the route of a vehicle in a traffic network is sufficient for identifying a route of a vehicle when transmitting route information to the vehicle as well as when transmitting route information to the central traffic station. The location of a possible turn of a vehicle is sufficiently defined by means of designating the next road following in the driving direction of the route and by designating the location of a path point; the continued forward movement direction of the vehicle is defined by sending the driving direction after the path point. For this purpose, a path point is defined wherever a vehicle has turned off or should turn off from a road.

According to a preferred embodiment of the invention, the transmitted route information indicates a route suggested by the central traffic station for the vehicle as a navigation aid, wherein the route information is transmitted to the vehicle from the central traffic station and wherein path points are defined wherever the central traffic station transmits a suggestion to the terminal unit in the vehicle that the vehicle should turn. This makes possible an efficient navigation aid for a vehicle without the need for the presence of a detailed map for remote areas, foreign territory, etc. or for location reference tables in the terminal unit in the vehicle.

According to a further embodiment of the invention, the route information describes a route which is traveled by a vehicle and concerning which the vehicle transmits information to the central traffic station (for interactive monitoring of navigation of the vehicle or for preparing traffic status reports or traffic forecasts); in so doing, the route information is transmitted from the terminal unit in the vehicle to the central traffic station. Path points are defined wherever the vehicle has turned off from a road. When this arrangement is used as a navigation aid, the name and, if necessary, the driving direction can be queried from the vehicle terminal unit to the central traffic station so as to be entered in the terminal unit by the user manually or acoustically for interactivity or for monitoring the path along which a navigated vehicle is driving. The direction can also be determined based on continuous GPS measurements. When using this arrangement for conveying information to the central traffic station about a path traveled by the vehicle for preparing traffic status reports or traffic forecasts, route information, especially a detection of the names of the roads being traveled, the locations of path points and the driving direction, is advisably detected in the terminal unit automatically; when determining position (e.g., from GPS), road names, locations of turnoff-path points, e.g., from a map in the terminal unit, and driving directions are automatically determined and sent as route information to the central traffic station.

There is advisably a digital map of the traffic network in the central station.

A route in the traffic network recommended by the central station to a terminal unit in a vehicle is calculated in the central station, e.g., by a route calculation program; in so doing, a digital map and/or traffic information, etc. can be included.

The communication between a central traffic station and a vehicle is advisably carried out by radio, especially mobile radio. The driving direction after a path point can be indicated and transmitted in the route information particularly as a compass point and/or as a turnoff direction (that is, left/right/straight/sharp left, etc.).

The process according to the invention can be implemented as a program in a central traffic station and in a terminal unit.

Further features and advantages of the invention are indicated in the following description of an embodiment with reference to the drawings.

DETAILED DESCRIPTION OF THE PREFERRED EMBODIMENTS

Figure 1:
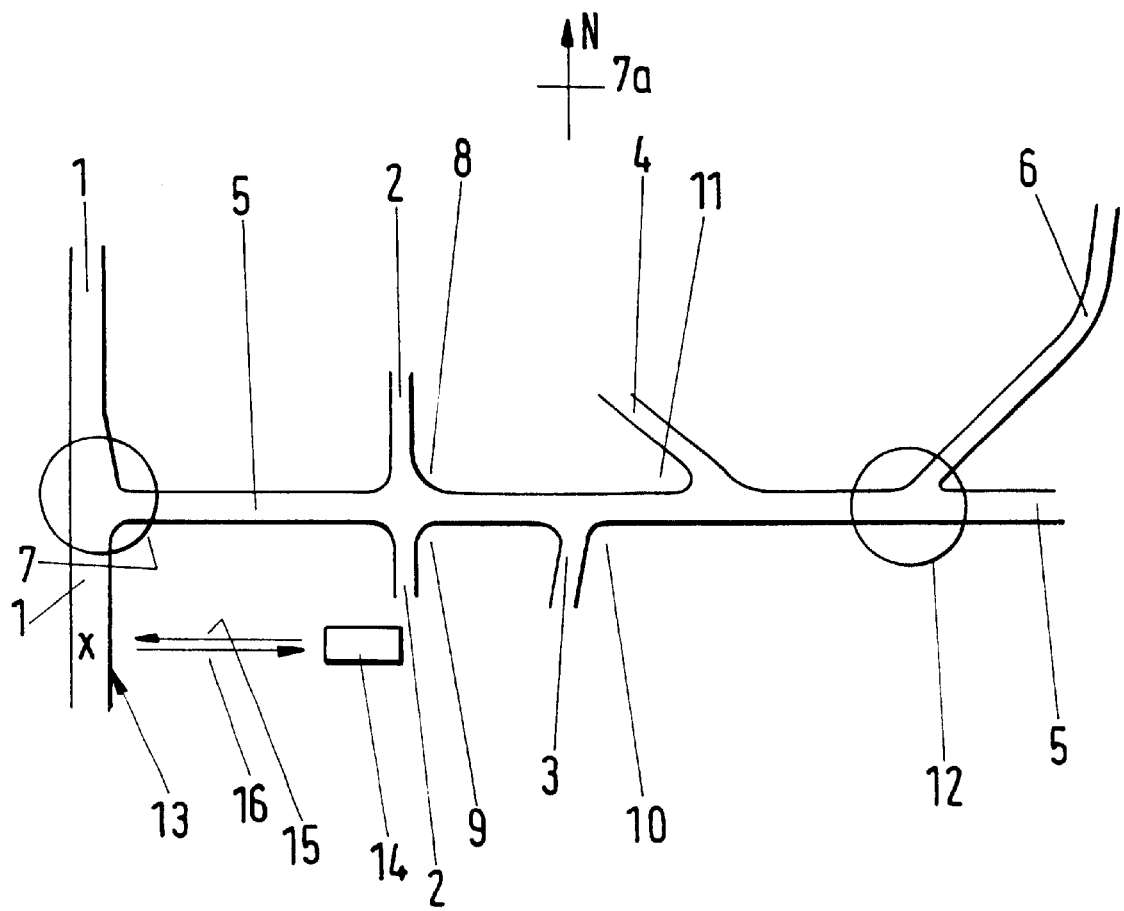
FIG. 1 shows a section from a traffic network.

The traffic network shown as a section in FIG. 1 has the following roads: 1=Kölner Strasse; 2=Verdi-Strasse; 3=Mozart-Strasse; 4=Hinterer Waldweg; 5=Beethoven-Strasse; 6=Bachstrasse. Also shown is a compass 7a which shows that the cardinal point in FIG. 1, at top, is north in the traffic network 1 to 6. Coming from the south on Kölner Strasse 1, the turn possibility 7 is to the right onto Beethoven-Strasse 5. Driving along Beethoven-Strasse 5, proceeding from turn possibility 7 in an easterly direction from Kölner Strasse, that is, to the right in FIG. 1, the possible turns on the left are 8 into Verdi-Strasse 2, 11 into Hinterer Waldweg 4, and 12 into Bachstrasse 6; the possible turns on the right are 9 into Verdi-Strasse 2 and 10 into Mozart-Strasse 3.

The vehicle 13 moves north on Kölner Strasse 1, that is, upward from the bottom in FIG. 1, to turn possibility 7.

By means of the process according to the invention, route information about a route traveled by the vehicle 13 with a terminal unit within a traffic network 1 to 6 can be transmitted 16 to a central traffic station 14 (by mobile radio, etc.), e.g., for monitoring navigation. Further, with the process according to the invention, information relating to a route, especially navigation aid information, can be transmitted 15 (by mobile radio, etc.) from the central traffic station 14 to the terminal unit in the vehicle 13.

The transmission of route information relating to a route traveled by a vehicle in a traffic network will be described first in the following. The vehicle 13 drives along Kölner Strasse 1 in FIG. 1, turns east at turn possibility 7, that is, to the right in FIG. 1, into Beethoven-Strasse 5 and drives along the latter until turn possibility 12, whereupon it turns north-east at turn possibility 12, that is, toward the upper right in FIG. 1, into Bachstrasse 6. This route of the vehicle 18 is to be transmitted 16 from a terminal unit in the vehicle 13 to the central traffic station 14 to enable interactive navigation and/or for further use in the central traffic station 14. A terminal unit in the vehicle 13 transmits a starting point of a route, e.g., based on its position which can be determined in the terminal unit, for example, by GPS. The route of the vehicle 13 can be transmitted 16 to the central traffic station in such a way that path points are defined in the terminal unit of the vehicle 13 wherever the vehicle turns off from a road. In the present case, a path point 7 is defined where the vehicle turns from Kölner Strasse 1 onto Beethoven-Strasse 5; another path point 12 is defined where the vehicle turns off from Beethoven-Strasse 5 into Bachstrasse 6. The next road in the driving direction, the location of the path point and the driving direction after the path point are designated and transmitted for these path points. The next road 5 in the driving direction, namely, Beethoven-Strasse 5, is designated at path point 7; the location of the path point is also designated, this location being determined, for example, by GPS; further, the driving direction after path point 7 is designated as "right" and/or "east." In a corresponding manner, the next road, Bachstrasse 6, in the driving direction of the route after path point 12, the location of path point 12, and the driving direction after path point 12, that is, toward the upper right and/or northeast in this case, are designated in the route information for path point 12. The location of a path point can be transmitted in the form of standardized geographic coordinates, for example, by a number in which the geographic longitude and latitude are given in a predetermined rounded off manner. The roads onto which a vehicle turns can be determined based on GPS and/or steering wheel angle with a digital map in the terminal unit in the vehicle 13. Further, a simpler terminal unit for the vehicle 13 is possible, wherein, for example, in order to enable interactive navigation, it is assumed that the user enters a turnoff 7, 12 onto another road in the terminal unit manually and/or acoustically.

No route data are transmitted in this case concerning the turn possibilities 8, 9, 10, 11 from a road 5 which is not perceived by the vehicle 13.

It is possible to detect the path of the vehicle 13 in the traffic network 14 based on the transmitted 16 route data. The central traffic station advisably has a digital map of the traffic network 1 to 6. Roads can accordingly be correlated with the determined path of the vehicle 13 in the digital map in the central traffic station 14. Based on the correlation, a navigation of the vehicle can be arranged interactively and/or a historical database can be set up and used for traffic information.

The transmission of route information concerning a route of a vehicle in a traffic network from the central traffic station 14 to a terminal unit in a vehicle 13 will be explained in the following. For example, the central traffic station 14 transmits 15 route information to a terminal unit in the vehicle 13 as a navigation aid for the vehicle 13.

A navigation aid of the type mentioned above can be requested from the central traffic station 14 (via mobile radio, etc.) by the vehicle 13, in particular while indicating its starting position and its desired target position. The central traffic station 14 determines with a route calculation program an optimum route for the vehicle 13; in this connection, the central traffic station 14 can take into account known backups, detours, accidents, distances in a digital map, lengths of different routes, etc. The central traffic station 14 initially transmits to a vehicle 13 the direction in which it should start driving. At a possible turnoff point 7 to 12, the central traffic station 14 only transmits route information when the vehicle 13 should turn off from a road. Thus, route information about the turn possibilities 7, 12 is transmitted; no route information is transmitted concerning turn possibilities 8, 9, 10, 11. The turn possibilities 7, 12 at which a vehicle 13 is to turn off from a road 1 or 5 into another road are defined in the central traffic station 14 as path points about which route information is to be transmitted. At path point 7, the central traffic station 14 transmits to a terminal unit in the vehicle 13 the next road, Beethoven-Strasse 5, following in the driving direction of the recommended route after path point 7 and the location of the path point as well as the driving direction which the vehicle should take after path point 7. The road is transmitted as "Beethoven-Strasse" in particular when there is no digital map in the terminal unit. When the central traffic station 14 has the location of the path point 7 and the current location of the vehicle 13 (for example, from a GPS measurement in the vehicle 13 and transmission of the location to the central traffic station 14), the location of the path point 7 can be sent in the form of a distance (3 km). Further, it is possible to transmit the absolute geographic position of the path point 7 in the form of its geographic coordinates rounded off in a standardized manner or in some other manner. The driving direction which the vehicle 13 should take after path point 7 can be indicated as a relative direction with respect to the previous driving direction of the vehicle, that is, in particular left, right, hard left, soft left, etc. Further, the driving direction can be indicated as a compass point, namely, north, south, east, west or, with a more accurate resolution, north, northwest, west, southwest, south, southeast, east, northeast, wherein this is particularly useful when a compass and/or a position detection system (such as GPS) is present in the vehicle 13. In a corresponding manner, the suggestion to turn into "Bachstrasse", the position of path point 12 and the direction in which to turn into Bachstrasse is sent to the vehicle as route information at path point 12.

Figure 2:
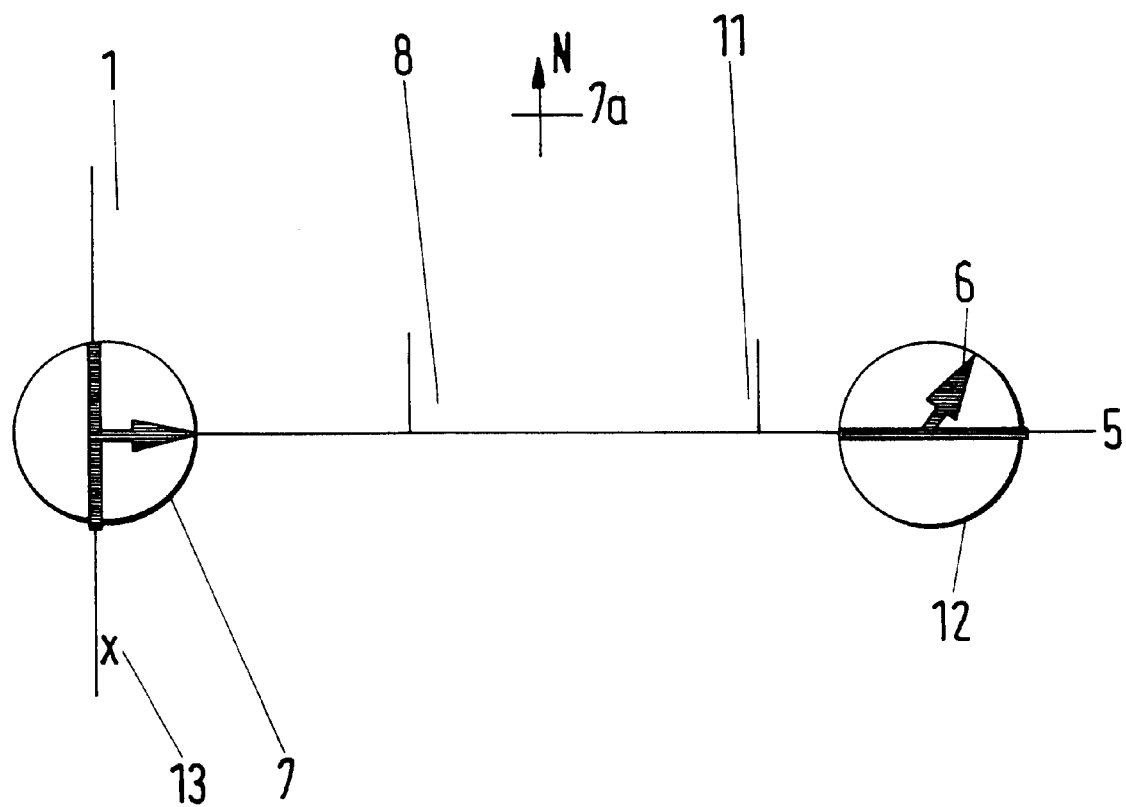
FIG. 2 shows an abstracted view of the section of the traffic network shown in FIG. 1.

FIG. 2 shows schematically in abstracted form the partial route of a vehicle in the section of the traffic network shown in FIG. 1. It is also possible for a view of this kind to be shown on a display in the terminal unit in the vehicle 13 for the driver's information. Further, only information for the next path point, that is, for example, the circle on the left-hand side of FIG. 2 containing the detail, can also be shown on a display in the terminal unit in the vehicle 13. The next path point can be displayed in such a way that north is on top as shown in FIG. 2, in a display in the terminal unit in the vehicle 13 or in such a way that the driving direction of the vehicle 13 extends upward on a display. In a corresponding manner, the information about path point 12 shown on the right-hand side in FIG. 2 (in the circle) can be displayed before path point 12. Further, the information can also be made available to the user acoustically.

What is claimed is:

1. A process for transmitting route information completely defining a route of a vehicle in a traffic network between a central traffic station and a terminal unit in the vehicle, wherein the route information concerns path points lying on the route, the process comprising the steps of:
   defining a path point at every location where it is recommended that the vehicle turn off from a road; and
   designating a next road following in a driving direction of the route, a location of the path point, and a driving direction after the path point in each instance in route information for a path point.

2. A process according to claim 1, wherein the route information gives a route suggested by the central traffic station to the vehicle as a navigation aid, the process including transmitting the route information from the central traffic station to the vehicle, and defining path points wherever it is suggested that the vehicle turns off from a road.

3. A process according to claim 1, wherein the route information describes a route traveled by the vehicle, the process including transmitting the route information from the terminal unit in the vehicle to the central traffic station, and defining path points where the vehicle has turned from a road.

4. A process according to claim 1, including utilizing a digital map of the traffic network in the central station.

5. A process according to claim 1, including utilizing a route calculation program in the central station for calculating a route for the vehicle.

6. A process according to claim 1, including storing a digital map of the traffic network in the terminal unit and using the stored digital map for determining a route traveled by the vehicle.

7. A process according to claim 1, including storing a digital map in the terminal unit and a digital map in the central station that are different.

8. A process according to claim 1, including transmitting the route information by radio.

9. A process according to claim 1, wherein the terminal unit requests a route suggestion from the central traffic station by indicating a current position of the terminal unit and a desired target position.

10. A process according to claim 1, including indicating the driving direction as a compass direction.

11. A process according to claim 1, including indicating the driving direction by intersection geometry.

12. A process according to claim 1, including indicating the next road located after the path point in the driving direction of the route by name.

13. A process according to claim 1, wherein the terminal unit does not have any digital map or no adequately detailed digital map for certain areas.

14. A process according to claim 1, wherein the transmission is carried out from the terminal unit to the central station.

15. A process according to claim 1, wherein the transmission is carried out from the central station to the terminal unit.

16. A central traffic station, comprising:
   a storage;
   a program stored in the storage for carrying out a process for transmitting route information completely defining a route of a vehicle in a traffic network between the central traffic station and a terminal unit in the vehicle, wherein the route information concerns path points lying on the route, the process including defining a path point at every location where it is recommended that the vehicle turn off from a road, and designating a next road following in a driving direction of the route, a location of the path point, and a driving direction after the path point in each instance in route information for a path point;
   a processor for running the program; and
   a communications device for at least one of the transmission of route information to the terminal unit and the reception of route information from the terminal unit.

17. A terminal unit, comprising:
   a storage;
   a program stored in the storage for carrying out a process for transmitting route information completely defining a route of a vehicle in a traffic network between a central traffic station and a vehicle terminal unit, wherein the route information concerns path points lying on the route, the process including defining a path point at every location where it is recommended that the vehicle turn off from a road, and designating a next road following in a driving direction of the route, a location of the path point, and a driving direction after the path point in each instance in route information for a path point;
   a processor for running the program; and
   a communications device for one of receiving and sending route information.

18. A terminal unit according to claim 17, further comprising a user interface, the interface being one of acoustic and optical.

19. A terminal unit according to claim 17, and further comprising a compass.

20. A terminal unit according to claim 17, and further comprising a data input for compass data.

* * * * *